No. 753,447. PATENTED MAR. 1, 1904.
C. & J. TATTERS.
ACETYLENE GAS GENERATOR.
APPLICATION FILED JUNE 23, 1903.
NO MODEL.
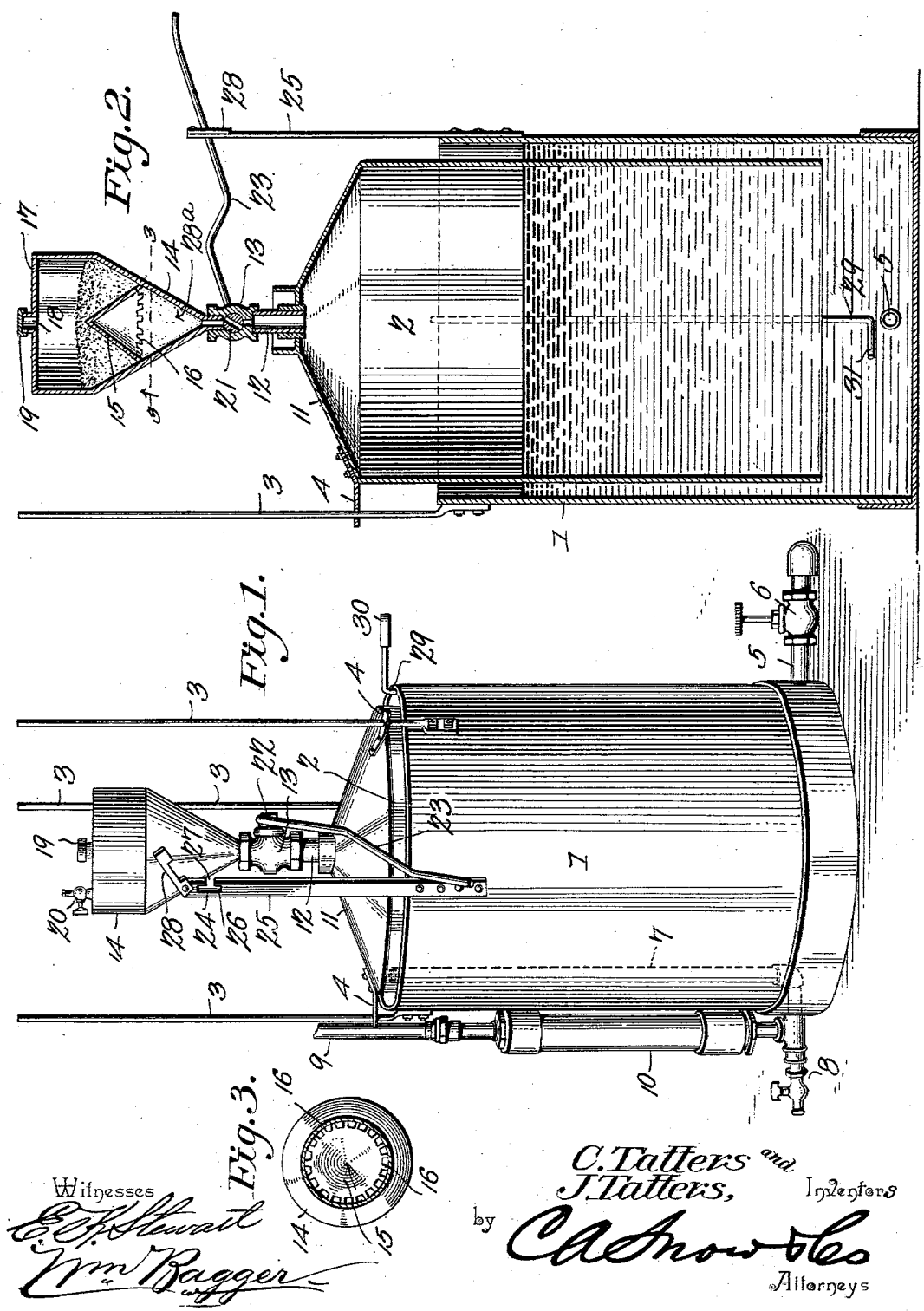
Witnesses
C. Tatters and J. Tatters, Inventors
by C. A. Snow & Co.
Attorneys No. 753,447.

Patented March 1, 1904.

UNITED STATES PATENT OFFICE.

CHRISTOPHER TATTERS AND JOHN TATTERS, OF EAGLELAKE, TEXAS.

ACETYLENE-GAS GENERATOR.

SPECIFICATION forming part of Letters Patent No. 753,447, dated March 1, 1904.

Application filed June 23, 1903. Serial No. 162,799. (No model.)

*To all whom it may concern:*

Be it known that we, CHRISTOPHER TATTERS and JOHN TATTERS, citizens of the United States, residing at Eaglelake, in the county of Colorado and State of Texas, have invented a new and useful Acetylene-Gas Generator, of which the following is a specification.

This invention relates to acetylene-gas generators; and it has for its object to provide a device of this class which shall possess superior advantages in point of simplicity, durability, and general efficiency.

The invention consists in the improved construction, arrangement, and combination of parts, which will be hereinafter fully described, and particularly pointed out in the claim.

In the accompanying drawings, Figure 1 is a perspective view of a device constructed in accordance with the principles of our invention. Fig. 2 is a sectional view of the same. Fig. 3 is a transverse sectional view taken on the line 3 3 in Fig. 2.

Corresponding parts in the several figures are indicated by similar numerals of reference.

In the form of embodiment of our invention herein shown is included a tank or water-reservoir 1, within which is vertically movable the bell or gas-holder 2, which is sealed by the water contained in the tank 1. The latter is provided with upwardly-extending guide-rods 3, engaging clips or staples 4, that extend laterally from the upper edge of the bell, which is thereby guided in such a manner that frictional contact with the sides of the water-tank will be avoided. The tank 1 is provided with a discharge-pipe 5, having a valve 6, through which its fluid contents may be drained off whenever desired. The gas-escape pipe 7 extends vertically through the tank above the water-level in the same and at its lower end is extended outwardly through the wall of the tank for the escape of gas. Said pipe is provided with a discharge-valve 8 and with a branch 9, leading to the burner or burners, said branch 9 being also provided with a purifier 10 of ordinary construction. The bell or gas-holder 2 has a coniform-hood 11, carrying an upwardly-extending feed-pipe 12, provided with a valve-casing 13, upon the upper side of which is mounted a carbid-reservoir 14. The latter, as will be observed, consists of an inverted coniform-hopper, within which is mounted a conical deflector 15, the lower edge of which is provided with a plurality of spaced arms or brackets 16, whereby it is connected with the inner wall of the receptacle 14. The latter has a close cover 17, provided with a filling-opening 18, capable of being tightly closed by means of a screw-cap 19. The cover is also provided with a blow-off cock 20.

The valve-casing 13 contains an ordinary two-way valve 21, which may be of any suitable construction, and which when the opening therethrough is in alinement with the openings in the valve-casing will permit the contents of the carbid-receptacle to pass through the feed-pipe 12 and gas-holder 2 into the water-bath contained in the tank 1.

In order to automatically regulate the position of the valve to cause a greater or less quantity of carbid to be fed or to entirely prevent the feeding thereof to the water-bath, we provide the stem 22 of the valve 21 with a handle 23, which extends through an opening 24 in the upper end of a standard 25, which is riveted or otherwise suitably secured to the tank 1. The opening 24 is in the nature of a slot 26, having a side opening 27, through which the lever or handle 23 may be inserted into the said slot, where it is loosely confined by means of a recessed member 28, which is pivotally connected with the upper end of the standard 25, so as to confine the handle 23 loosely in the slot thereof. By this construction when the gas-holder rises the valve 21 will gradually be closed, thereby arresting the feed of carbid. When, on the other hand, the gas is being consumed and the holder is accordingly lowered, the valve will gradually become opened to its full extent, thereby permitting the carbid to pass freely into the water-bath. It will be observed that the carbid, which is usually fed in a finely-comminuted state in order to reach the feed-tube, must pass between the peripheral arms 16, which support the conical deflector 15 within the reservoir. By this construction an extended area is provided for the passage of the granules of carbid, thereby lessening the liability of the feed becoming choked. The granules pass between arms 16 into the extended space 28ª of the hopper below the deflector, where there is no possibility of choking. It will also be seen that even if the spaces between several of the arms 16 should become choked the efficiency of the feed device will in no wise become impaired thereby. Again, the automatic cut-off herein described will operate to prevent an excess of carbid from accumulating in the space 28ª.

In order to throw the feeding device out of operation, it is only necessary to disconnect the lever or handle 23 from the slot 26 in the standard 25 and permit the said handle to drop down. This will result in the closure of the valve and the suspension of the feed until the valve is again opened by placing the lever or handle in operative connection with the standard 25.

29 designates a vertical rod which passes through the space between the tank 1 and the gas-holder 4, said rod being provided at its upper end with a handle 30 and at its lower end with a horizontally-disposed arm 31, which normally rests upon the bottom of the water-tank. It will be seen that by simply reciprocating the handle 30 the arm 31 will sweep over the surface of the bottom of the water-tank, thereby agitating the contents and stirring up the sediment to be further and profitably acted upon by the water.

From the foregoing description, taken in connection with the drawings hereto annexed, the operation and advantages of our invention will be readily understood. The construction is simple, inexpensive, and we desire to state that while we have herein shown and described a preferred construction we do not thereby limit ourselves to the precise structural details herein set forth, but reserve the right to any changes, alterations, and modifications which may be resorted to within the scope of our invention and without departing from the spirit or sacrificing the utility of the same.

Having thus described our invention, we claim—

In a device of the class described, a tank, an inverted gas-holder movable vertically in said tank, upwardly-extending guides upon said tank, means upon the gas-holder engaging said guides, a valved feed-pipe extending upwardly from the gas-holder and supporting a carbid-reservoir, an operating-arm extending outwardly from the valve, a standard rising from the water-tank and having a T-shaped slot near the upper end thereof for the reception of the valve-operating arm, and a notched slide pivotally connected with the upper end of the standard and adapted to close the side opening of the T-shaped slot to confine the valve-operating arm in the latter.

In testimony that we claim the foregoing as our own we have hereto affixed our signatures in the presence two witnesses.

CHRISTOPHER TATTERS.
JOHN TATTERS.

Witnesses:
G. H. WALLACE,
J. F. AHLERS.